United States Patent
Venkatasubramanian et al.

(10) Patent No.: US 8,788,733 B2
(45) Date of Patent: Jul. 22, 2014

(54) SIGNAL AND POWER INTERCONNECT FOR DISPLAY DEVICE

(75) Inventors: Narayanan Venkatasubramanian, Karnataka (IN); Durga Venkata Prasad Sreeram, Karnataka (IN)

(73) Assignee: Prysm, Inc., San Jose, CA (US)

( * ) Notice: Subject to any disclaimer, the term of this patent is extended or adjusted under 35 U.S.C. 154(b) by 849 days.

(21) Appl. No.: 12/980,599

(22) Filed: Dec. 29, 2010

(65) Prior Publication Data

US 2011/0267475 A1    Nov. 3, 2011

(30) Foreign Application Priority Data

Apr. 28, 2010    (IN) .............................. 1183/CHE/2010

(51) Int. Cl.
*G06F 3/00*     (2006.01)
*G06F 13/42*    (2006.01)

(52) U.S. Cl.
USPC ................ 710/106; 710/15; 710/19; 710/105

(58) Field of Classification Search
USPC ................ 710/105–106, 15, 19, 305; 307/42; 345/1.1; 714/25, 44
See application file for complete search history.

(56) References Cited

U.S. PATENT DOCUMENTS

| | | | |
|---|---|---|---|
| 8,379,061 B2 * | 2/2013 | Islam | 345/690 |
| 2010/0283324 A1 * | 11/2010 | Lee et al. | 307/42 |
| 2011/0267328 A1 * | 11/2011 | Venkatasubramanian et al. | 345/211 |

* cited by examiner

*Primary Examiner* — Thomas J Cleary
(74) *Attorney, Agent, or Firm* — Patterson & Sheridan, LLP

(57) ABSTRACT

Embodiments of the present invention generally provide an interconnect between a data signal source and a display device. The interconnect may be used to transmit data signals, command data, and power from the data signal source to the display device. The interconnect also may be used to transmit feedback data from the display device to the data signal source.

20 Claims, 6 Drawing Sheets

SIGNAL AND POWER INTERCONNECT FOR DISPLAY DEVICE

BACKGROUND OF THE INVENTION

1. Field of the Invention

Embodiments of the present invention generally relate to a display device used to display an image, and, more specifically, a signal and power interconnect for a display device.

2. Description of the Related Art

Electronic display systems are commonly used to display information from computers and other sources. Typical display systems range in size from small displays used in mobile devices to very large displays that are used to display images to thousands of viewers at one time. Tiled display walls provide a large-format environment for presenting large high-resolution images by synchronizing and coupling together the output from multiple distinct imaging systems. Such large displays may be created by tiling a plurality of smaller display devices together. For example, the video walls frequently seen in the electronic media typically use multiple display modules, such as flat-panel displays, which are tiled to create such large displays.

FIG. 1A illustrates a tiled wall display 100 configured to display an image 102, according to the prior art. The tiled wall display 100 includes display modules 104-1 through 104-9 that each is configured to display a different portion of the image 102. FIG. 1B illustrates the tiled wall display 100 of FIG. 1A in greater detail. As shown, each display module 104 is coupled to a power source 106, a controller 108, and a video signal source 110. A given display module 104 receives power from the power source 106 via a dedicated power cable 107, receives control signals from the controller 108 via a dedicated control cable 109, and receives a video signal from the video signal source 110 via a dedicated video cable 111. The video cable 111 is typically a rigid, expensive, and heavy digital video interconnect (DVI) cable.

One drawback of this approach is that operation of the tiled wall display 100 requires numerous cables, as illustrated by FIG. 1B. Since each display module receives a power cable 107, control cable 109, and a video cable 111, the tiled wall display 100 must be coupled to at least 27 separate cables in order to function. Such a configuration may be cumbersome to assemble and to maintain, and, additionally, may be difficult to troubleshoot if a malfunction occurs with one of the cables or display modules 104.

Another drawback of the approach described above is that DVI cables are bulky and have a high bending radius, making the tiled wall display 100 difficult to assemble and to maintain. In addition, DVI cables alone cannot be used to perform alignment and/or diagnostic operations involving the display modules 104. Typically, an additional cable must be coupled to each display device 104 when performing such operations. Coupling extra cables to the tiled wall display 100 when the tiled wall display 100 is already installed may be difficult and time-consuming.

As the foregoing illustrates, there is a need in the art for a tiled display system having a simpler cabling topology than prior art designs.

SUMMARY OF THE INVENTION

Embodiments of the present invention may provide an image display system, comprising a signal box (sbox) configured to transmit one or more data packets, a display device configured to receive the one or more data packets and display a digital image on a screen, and an interconnect coupling the sbox to the display device, comprising a first electrical conductor adapted to deliver the one or more data packets from the sbox to the display device, and a second electrical conductor adapted to deliver power provided by the sbox to the display device, wherein the display device displays the digital image using the power provided by the sbox.

The present invention also provides a method for displaying a digital image on a display device, comprising transmitting power from a signal box (sbox) to the display device via an interconnect, and transmitting one or more data packets from the sbox to the display device via the interconnect, wherein the display device displays the digital image using the power transmitted by the sbox.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 2:
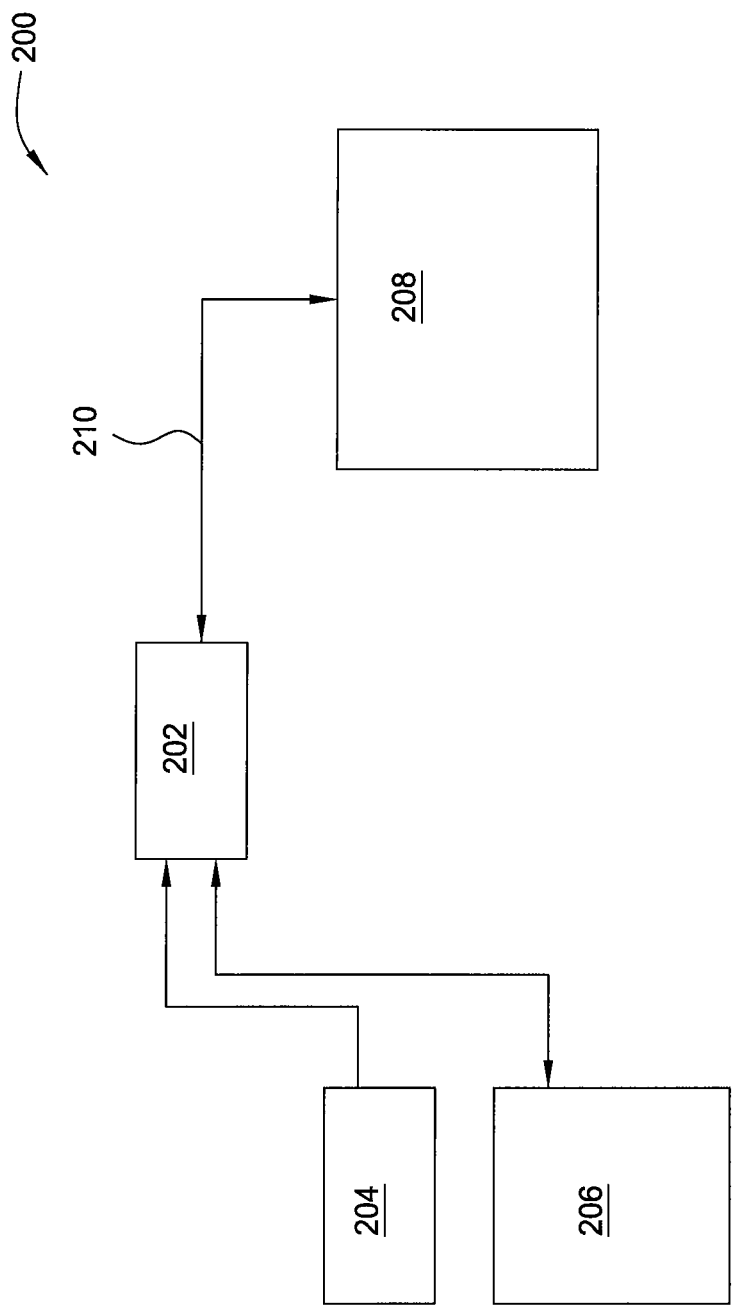
FIG. 2 illustrates an image display system, according to one embodiment of the invention.

Embodiments of the present invention generally provide an interconnect between a data signal source and a display device. The interconnect may be used to transmit data signals, command data, and power from the data signal source to the display device. The interconnect also may be used to transmit feedback data from the display device to the data signal source. FIG. 2 illustrates a display system 200 configured to implement the interconnect of the present invention.

Figure 1A:
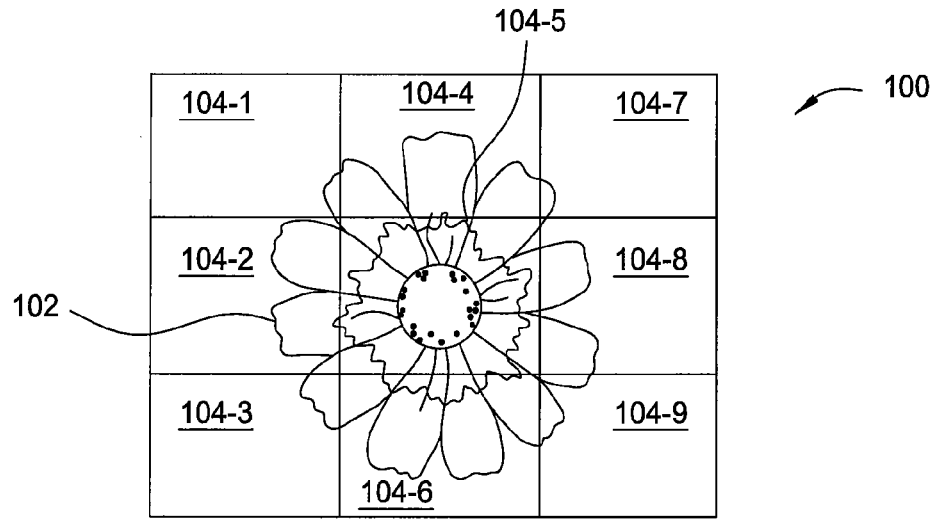
FIG. 1A illustrates a tiled wall display configured to display an image, according to the prior art.
Figure 1B:
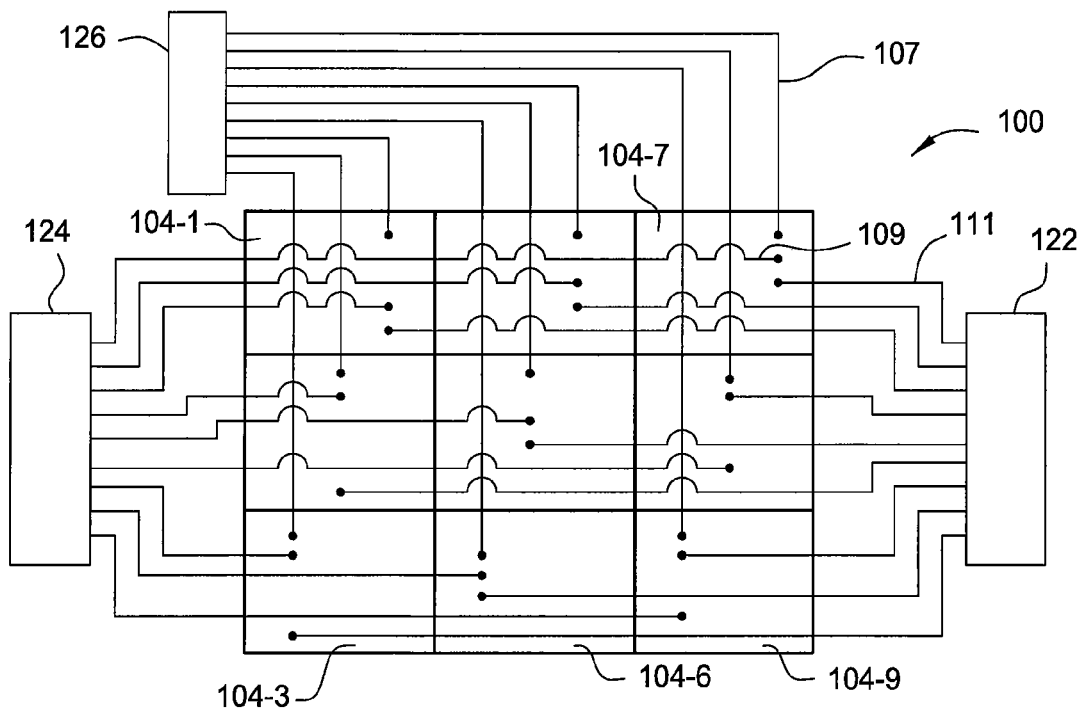
FIG. 1B illustrates a tiled wall display configured to display an image, according to the prior art.

As shown, the display system 200 includes a signal box (sbox) 202, a media player 204, a computing device 206, and at least one display device 208. In one embodiment, the display device 208 is part of a tiled display device, such as the tiled wall display 100 illustrated in FIGS. 1A and 1B, which are all interconnected in daisy chain type arrangement. The media player 204 and the computing device 206 are coupled to the sbox 202. The sbox 202 is coupled to the display device 208 via interconnect 210. The interconnect 210 is an electrical interconnecting element, or electrical conductor, that may be used to conduct data signals and/or power. In one embodiment, the interconnect 210 comprises one or more shielded category-6 (cat-6) cables. The display system 200 is also typically coupled to an external power source via a separate power cable (not shown). As described herein, the display system 200 may also draw a certain amount of power from the interconnect 210, which also may be used to conduct data signals.

The media player 204 may be a digital video disk (DVD) player, a blu-ray disk (BRD) player, or any other technically feasible media player. The media player 204 is configured to read digital media, such as, for example, DVDs, and to transmit video data, including image data, to the sbox 202. The computing device 206 may be a personal computer (PC), an integrated circuit (IC), or any other technically feasible type of computing device. The computing device 206 is generally designed to facilitate the control and automation of the various components found in the display system 200, and typically includes a central processing unit (CPU) (not shown), memory (not shown), and support circuits (or I/O) (not shown). The CPU may be one of any form of computer processors that are used in industrial settings for controlling various components and monitor the state of the various processes. The memory is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the computing device 206 determines which tasks are performable within the display system 200, and are generally used to control, among other components, the sbox 202. The sbox 202, in turn, controls the display device 208.

The sbox 202 may be a field-programmable gate array (FPGA), a graphics processing unit (GPU), or any other technically feasible image processor. The sbox 202 is configured to process video data received from the media player 204 in response to commands received from the computing device 206. The sbox 202 then transmits data signals, including data packets, to the display device 208 via the interconnect 210. In one embodiment, the data signals include uncompressed, packetized video data. The sbox 202 may also provide power to the display device 208 via the sbox interconnect 210. In one embodiment, the sbox 202 is coupled to or integrated within the display device 208.

The display device 208 is configured to display a digital image received from the sbox 202. The digital image may comprise a single frame of video data. In one embodiment, the display device 208 is included within a tiled display system and is configured to display a portion of a digital image that is displayed, as a whole, by the tiled display system. In a further embodiment, the display device 208 is a laser-based display device, as described in greater detail below in conjunction with FIG. 3A.

Figure 3A:
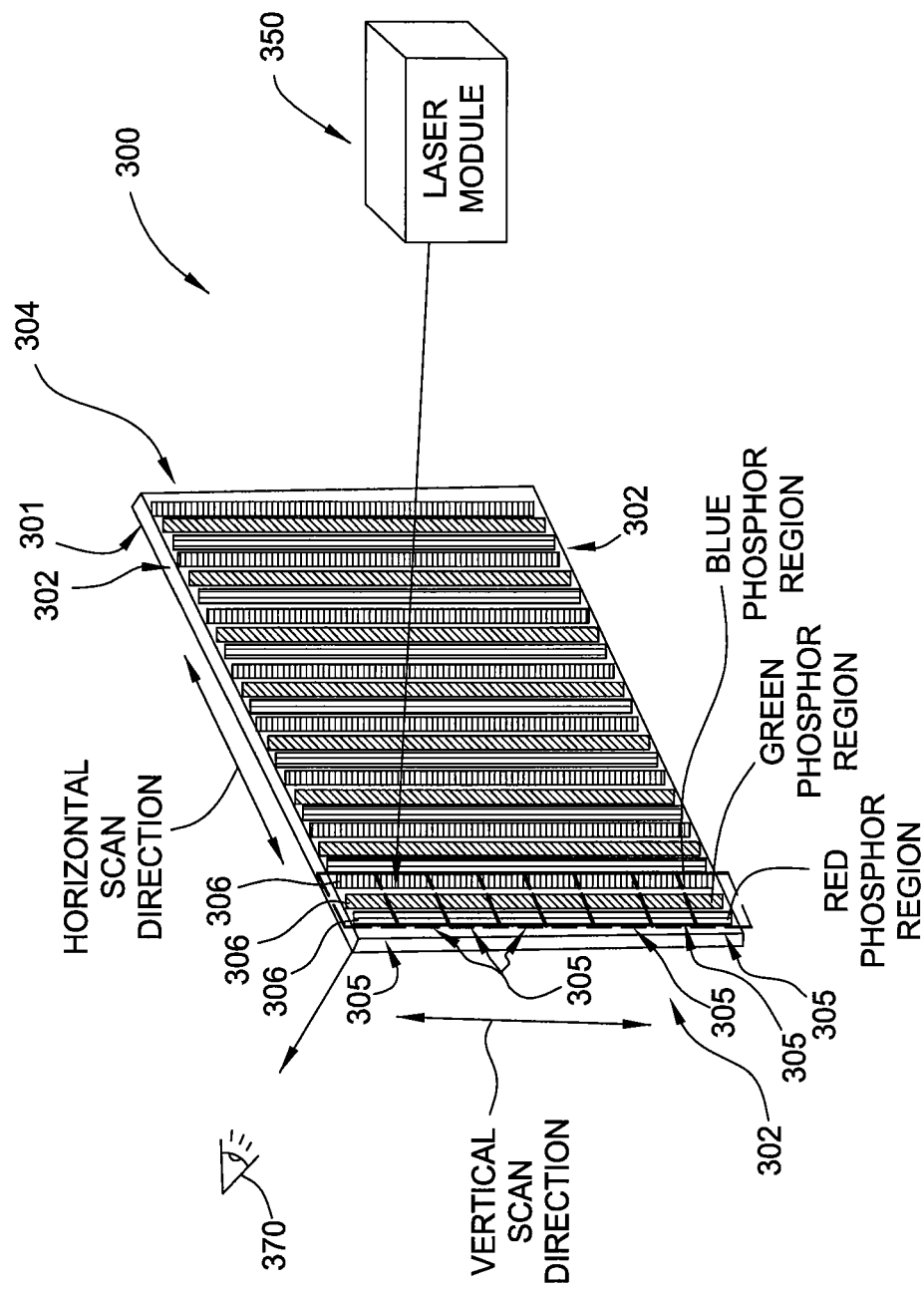
FIG. 3A illustrates a laser-based display device, according to one embodiment of the invention.

FIG. 3A illustrates a laser-based display device 300, according to one embodiment of the invention. The laser-based display system 300 includes a plurality of phosphor regions formed on the image surface 302 of the screen 304. As shown, a laser containing laser module 350 and an audience 370 are positioned on two opposite sides of the screen 304, i.e., the rear side and the front side of the screen 304, respectively.

The screen 304 includes one or more image pixel elements 305, that each outputs light for forming and delivering images to the viewing surface 301 of the screen 304 by the optical emission of visible light created by the laser excitation of the phosphor containing regions. An array of image pixel elements 305 are used to form the image at the viewing surface 301 by individually controlling the composite color and image intensity at each image pixel element's location. In the illustrated example, the dimension of the pixel region is defined by the physical width of the three color regions, or stripes, in one dimension (e.g., the horizontal scan direction perpendicular to the color stripes) and the control of the beam spot size for a particular image information in the other dimension without a physical boundary of the pixel region (e.g., the vertical direction parallel to the color stripes). It should be noted that the beam spot size can also be affected by the angular position of the laser emitted radiation relative to the image surface. In other implementations, both dimensions of the image pixel element 305 may be defined by physical boundaries.

Each pixel region 305 includes three sub-pixel regions 306, which emit light in three different colors, such as red, green and blue. In each image pixel element 305, the respective portions of the three parallel light emitting regions are optically active regions that emit visible light and any unwanted space between the light-emitting stripes is filled with a non-light-emitting material forming a divider located between the light-emitting stripes. In one example, each of the sub-pixel regions 306 is spaced at about a 500 to about 550 µm pitch. In one example, each of the sub-pixel regions 606 is spaced at a pitch between about 125 µm and about 1000 µm. In general, it is desirable to form the image pixel elements 305 as close as practicable to the screen edges 302.

Figure 3B:
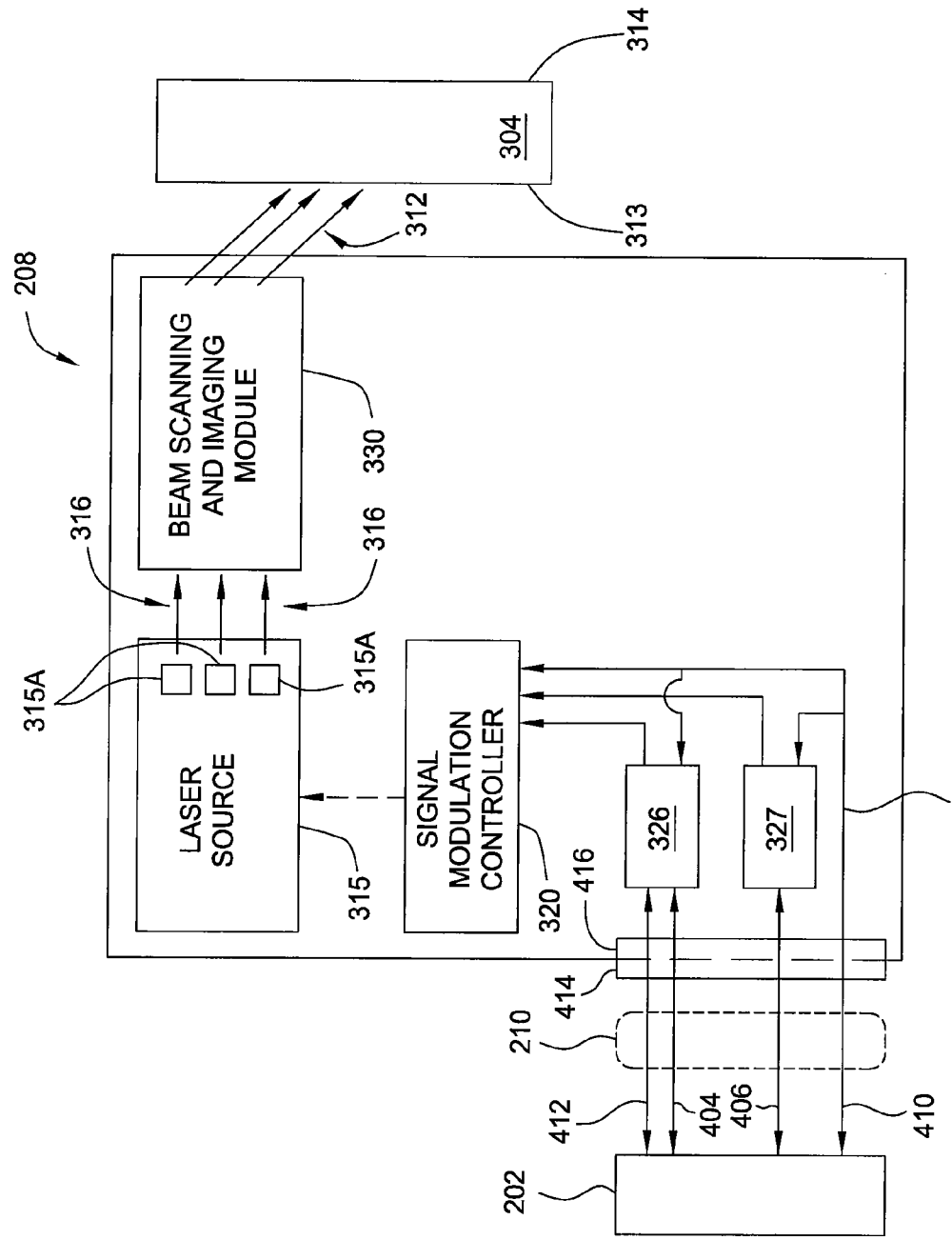
FIG. 3B illustrates a laser-based display device, according to one embodiment of the invention.

FIG. 3B is a schematic diagram of the some of the internal components of a laser-based display device 300 that may benefit from one or more of the embodiments of the invention described herein, and form part of each display device 208. In one embodiment, the laser-based display device 300 generally includes the screen 304, as discussed above. The display device 208, which is used to produce a scanning laser beam to excite the phosphor material found in each sub-pixel regions 306. Display device 208 is adapted to deliver one or more scanning optical beams, or a modulated beam 312, that are scanned along two different directions, for example, the horizontal direction and the vertical direction, in a raster scanning pattern across the screen 304. In one embodiment, the phosphor regions are parallel regions, or stripes, disposed on an image surface 313 of the screen 304. In one embodiment, each of the phosphor regions comprise a plurality of sub-pixel regions 306, or portions of the stripes. The display device 208 may be a single mode laser or a multimode laser. The laser may also comprise a single mode along the direction perpendicular to the elongated direction phosphor regions to have a small beam spread that is confined with the width of each phosphor region. An example of a laser based display system that may be used with one or more of the embodiments described herein is further described in the commonly assigned U.S. patent application Ser. No. 12/123,418, entitled "Multilayered Screens with Light-Emitting Stripes for Scanning Beam Display Systems," filed May 19, 2008, which is incorporated herein in its entirety.

In one embodiment, to form an image on screen 304 using a laser-based display device 300, a laser source 315 produces a laser beam 316 that is modulated to form an image by delivering desired amounts of optical energy to each of the red, green, and/or blue phosphor regions found within multiple image pixel elements 305 formed on the image surface 313. Display device 208 in this implementation includes a signal modulation controller 320, which modulates the output of laser source 315 directly to control the energy delivered to each of the phosphor regions based on the video and control signal information received from the sbox 202. For example, the signal modulation controller 320 may control the driving current of a laser diode, which is found in the laser source 315. In one embodiment, the signal modulation controller 320 receives a video signal, control signal, and optionally power from the sbox 202 through the interconnect 210. In one example, the video signal is received from a video processor 326, the control signal is received from a control signal processor 327, and the power is received from the power line 328 that are all delivered from the sbox 202 along the interconnect 210. During operation, the beam scanning and imaging module 330 projects the modulated beam 312 to screen 304 using the information received from the sbox 212. In one embodiment, laser source 315 further comprises two or more lasers 315A that use the data received from the s-box 202 and various optical components in display device 208 to deliver an array of beams to the phosphor regions disposed on the screen 304, so that an image can be seen by a viewer positioned on the viewing side 314 of the screen 304. In one embodiment, each of the lasers 315A is a laser that emits electromagnetic radiation at a wavelength between about 180 and about 450 nm. In one embodiment, the output of between about 2 and 25 lasers 315A are modulated by the signals received along the interconnect 210 from the s-box 202.

Those skilled in the art will understand that the laser-based display device 300 represents just one embodiment of the display device 208, and that the display device 208 illustrated in FIG. 2 may be any display device configured to communicate with the sbox 202 via the interconnect 210, including, for example, a rear projection television set, a plasma display, a LED based display, a liquid-crystal display, or a cathode ray-tube display, among others.

Referring back now to FIG. 2, as described, the sbox 202 is configured to transmit data signals, including data packets, to the display device 208 via the interconnect 210. As also described, the sbox 202 may provide a certain amount of power to the display device 208 via the interconnect 210. In addition, the display device 208 is configured to transmit feedback data packets to the sbox 202 in response to the information sent to the display device 208. In one embodiment, the data packets transmitted by the sbox 202 to the display device 208 comprise command data, and the feedback packets include status information associated with the display device 208.

In another embodiment, the sbox 202 transmits data packets to the display device 208 via the interconnect 210 in order to perform an alignment procedure with the display device 208. When the display device 208 is a laser-based display device, as illustrated in FIG. 3A, the display device 208 may use the data packets received from the sbox 202 in order to modify transmission settings associated with the laser module 350. For example, the display device 208 could identify a range of image pixel elements 305 to which the laser module 350 can be directed based on information included within the data packets. When the sbox 202 performs the alignment procedure, the display device 208 may transmit feedback data packets to the sbox 202 via the interconnect 210, including information specifying the state of the alignment procedure being performed by the sbox 202. In yet another embodiment, the sbox 202 transmits data packets to the display device 208 via the interconnect 210 in order to update firmware associated with the display device 202. In further embodiments, the sbox 202 transmits data packets to the display device 202 in order to perform diagnostic and/or troubleshooting subroutines, and, additionally, receives feedback packets associated with those subroutines.

In general, the interconnect 210 can be used to transfer data packets and power between the sbox 202 and the display device 208. The interconnect 210 includes a plurality of separate twisted wire pairs across which the data packets and power are conducted. Each twisted wire pair is shielded in order to prevent interference from external sources. Additionally, each twisted wire pair is disposed within the interconnect 210 in a configuration that reduces crosstalk with the other twisted wire pairs, as described in greater detail below in conjunction with FIG. 4

Figure 4:
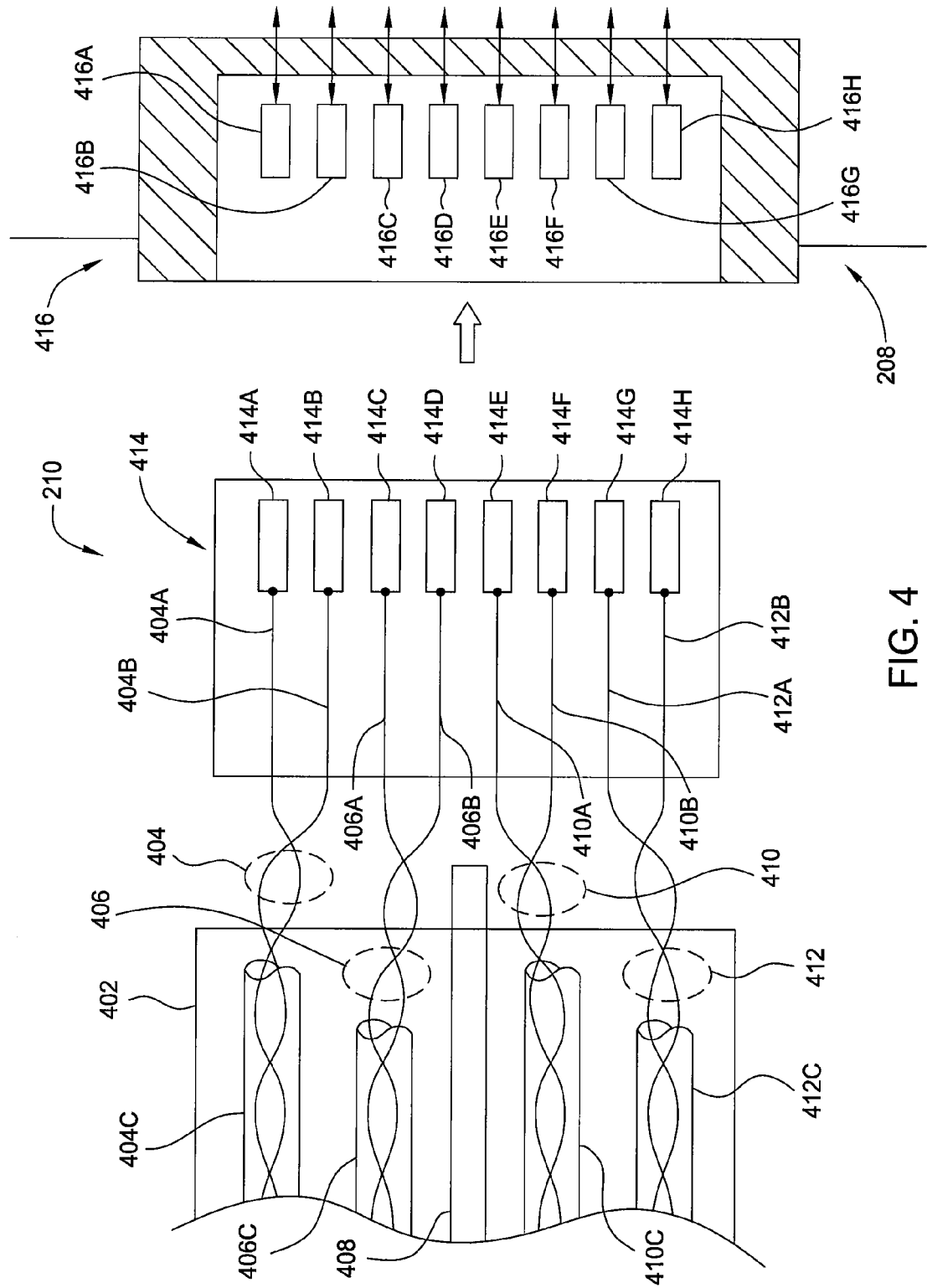
FIG. 4 is a schematic view of an interconnect, according to one embodiment of the invention.

FIG. 4 is a schematic view of the interconnect 210, according to one embodiment of the invention. In one embodiment, as shown, the interconnect 210 includes shielding 402 that surrounds twisted wire pairs 404, 406, 410, and 412, spine 408, and at least one connector 414. In one embodiment, at least one wire, or electrical conductor, in each of the twisted wire pairs 404, 406, 410, and 412 is configured to deliver power or a data signal between the interconnected devices. In one configuration, a spine 408 is disposed between the twisted wire pairs 406 and 410. As discussed above in conjunction with FIG. 2, in one embodiment, the interconnect 210 is a shielded cat-6 cable. One advantage of using a cat-6 cable is that cat-6 cables generally provide a higher data rate and a higher signal-to-noise ratio than conventional cables, such as category-5 (cat-5) cables.

Each of the twisted wire pairs 404, 406, 410, and 412 includes two separate wires, or electrical conductors, that are twisted together and configured to conduct data signals and/or power. In one embodiment, each twisted wire pair is also shielded from the other twisted wire pairs within the interconnect 210. However, persons skilled in the art will understand that each of the twisted wire pairs 404, 406, 410, and 412 may or may not be shielded. As shown, the twisted wire pair 404 includes wires 404A and 404B surrounded by shielding 404C. In like fashion, the twisted wire pair 406 includes wires 406A and 406B surrounded by shielding 406C, the twisted wire pair 410 includes wires 410A and 410B surrounded by shielding 410C, and the twisted wire pair 412 includes wires 412A and 412B surrounded by shielding 412C. In one embodiment, the shielding 404C, 406C, 410C and/or 412C each comprise a metal foil or braided wire that are typically coupled to a ground to electrically shield the signals passing through the twisted wire pairs.

The twisted wire pairs 404, 406, 410, and 412 are coupled to the connector 414 illustrated in FIG. 3B. The connector 414 includes a plurality of pins 414A-H to which the wires disposed in each of the twisted wire pairs 404, 406, 410, and 412 can be coupled. As shown, wire 404A is coupled to pin 414A, wire 404B is coupled to pin 414B, wire 406A is coupled to pin 414C, wire 406B is coupled to pin 414D, wire 410A is coupled to pin 414E, wire 410B is coupled to pin 414F, wire 412A is coupled to pin 414G, and wire 412B is coupled to pin 414H. Those skilled in the art will recognize that the connector 414 may form either end of the interconnect 210, and the wiring in the connector on opposing ends of the interconnect 210 can be configured in a straight or a cross-wired configuration. Each of the wires is coupled to one of the pins 414A-H in the connector 414 according to a particular configuration that serves to reduce crosstalk between the signals passing through the wires, as discussed in greater detail below. Those skilled in the art will recognize that the configuration of twisted wire pairs, wires, and pins can be arranged and implemented to form either end of the interconnect 210.

The connector 414 is configured to be coupled to a jack 416. In one example, the connector 414 is a male RJ-45 type connector and jack 416 is a female RJ-45 connector. The jack 416 is configured to receive the connector 414 and to make electrical contact with the pins 414A-H. More specifically, the jack 416 includes a plurality of slots 416A-G into which the pins 414A-G can be inserted to make contact with the mating electrical contact pins disposed in each of the slots 416A-G. Slot 416A is configured to receive pin 414A, slot 416B is configured to receive pin 414B, slot 416C is configured to receive pin 414C, slot 416D is configured to receive pin 414D, slot 416E is configured to receive pin 414E, slot 416F is configured to receive pin 414F, slot 416G is configured to receive pin 414G, and slot 416H is configured to receive pin 414H. The slots 416A-G within the jack 416 are configured to route data signals and/or power conducted across the twisted wire pairs 404, 406, 410 and 412, the pins 414A-G, and the slots 416A-G to the signal video processor 326, the control signal processor 327, and/or the signal modulation controller 320. In general, each of the twisted wire pairs 404, 406, 410, and 412 conducts power or a specific type of data signal to the jack 416, as discussed in greater detail below.

In one embodiment of the interconnect 210, the twisted wire pair 404 is configured to transmit a strobe signal that may be used to synchronize the operation of one or more processing units (none shown). One such processing unit may be included within the display device 208. In one embodiment, the twisted wire pair 404 synchronizes the operation of one or more field-programmable gate arrays (FPGAs), one of which may be included within the display device 208. The twisted wire pair 404 may conduct signals that employ a low-voltage differential signaling (LVDS) system.

In one embodiment of the interconnect 210, the twisted wire pair 406 is configured to conduct a 9-bit universal asynchronous receiver/transceiver (UART) signal that may be used to transmit command data from the sbox 202 to a microcontroller (not shown) within the display device 208. The twisted wire pair 404 is also configured to transmit feedback data packets from the microcontroller to the sbox 202. In general, the twisted wire pair 406 may transmit UART signals unidirectionally or bi-directionally. In one embodiment, the twisted wire pair 406 is coupled to the control signal processor 327, which is used to control various components in the display device 208 so that a digital image can be displayed on the screen 304 (FIG. 3B).

In one embodiment of the interconnect 210, the twisted wire pair 410 is configured to conduct power between the connected devices. In one embodiment, the twisted wire pair 410 is configured to conduct at least about 1 watt of power at a voltage of about 5 Volts DC. The power conducted by the twisted wire pair 410 generally is sufficient to power some of the internal circuitry within the display device 208, including the video processor 326 and the control signal processor 327. It should also be noted that the display device 208 may also receive additional power to drive one or more of the image display components (e.g., plurality of lasers, optical steering components, internal circuitry) using a separately connect display device power supply (not shown), such as a 120 Volt AC power supply.

In general, the twisted wire pair 410 provides a dedicated conduit of power from the sbox 202 to the display device 208, while the twisted wire pairs 404, 406, and 412 may be used to conduct data signals associated with video data packets, alignment procedures, firmware updates, troubleshooting subroutines, diagnostic subroutines, feedback packets, and/or other types of data. In one configuration, the twisted wire pair 410 is used to deliver power, such as about 1 Watt at about 5 volts DC, from the sbox 202 to the video processor 326 and control signal processor 327 when the power supply (not shown) found in the display device 208 has become inoperative. In one example, the power delivered across the twisted wire pair 410 is delivered at a voltage of about ±5 volts DC. In another example, the power delivered across the twisted wire pair 404 is delivered at a voltage of between about 0 and about 12 volts DC. In another embodiment, the twisted wire pair 410 conducts more than 5 volts DC. In further embodiments, the interconnect 210 comprises a plurality of small gauge wires (e.g., 22-24 AWG copper wires), such as in the case where cat-6 cables are used. In this embodiment, it is desirable to limit the amount of power transferred through the wires in the interconnect 210 to 15 Watts or less to prevent overheating of the wires and shielding, which may cause connection reliability problems and/or create a fire hazard. In another embodiment, it is desirable to limit the amount of power transferred through the wires in the interconnect 210 to 10 Watts or less.

The power delivered from the sbox 202 through the interconnect 210 can also be delivered to other display devices 208 that are interconnected with the display device 208 shown in FIG. 2. Such a configuration allows powered devices coupled to the interconnect 210 to transfer received information from the sbox 202 to other devices also coupled to the interconnect 210.

In one embodiment of the interconnect 210, the twisted wire pair 412 is configured to conduct high-speed data signals between the connected devices. The data signals may comprise packetized, uncompressed, multiplexed, video data packets that can be transmitted to specific, different, display devices coupled to the interconnect 210. Each data packet may be assigned a unique address used to route that data packet to a target display device. The twisted wire pair 412 conducts data signals that employ current mode logic (CML) in order to transmit data at higher speeds than that associated with the twisted wire pairs 404 and 406. In one embodiment, that speed is about 3.125 Gb/s. In another embodiment, the twisted wire pair 404 is coupled to the video processor 326 and conducts data signals used for alignment operations, among other things. In further embodiments, the twisted wire pair 412 is coupled to the video processor 326 and conducts video signals and data signals to the video processor 326.

As shown, the wires 412A-B associated with the twisted wire pair 412 are disposed within the connector as far away as possible from the wires 404A-B associated with the twisted wire pair 404 and the wires 406A-B associated with the twisted wire pair 406. Since the wires within the connector 414 are generally not surrounded by a grounded shielding, as illustrated, interference between those wires may occur within the connector 414. In particular, since the wires 412A-B may conduct high-speed data signals and wires 404A-B and 406A-B may conduct lower-speed data signals, as described above, the data signals conducted across wires 404A-B and 406A-B may interfere with the data signals conducted across wires 412A-B. The need to assure that the interference between data transmitting wire pairs is minimized, becomes increasingly important when one or more of the wire pairs is transmitting a video data signal, due to the need to assure the integrity of the to be displayed video data. In order to minimize potential interference between data these signals, the wires 404A-B and 406A-B are disposed on the opposite side of the connector 414 to the wires 412A-B. In general, the twisted wire pair 410, which is used to conduct power, is disposed between the twisted wire pairs 404, 406 and the twisted wire pair 412 within the connector 414. Persons skilled in the art will recognize that the positions of wires 412A and 412B may be exchanged without departing from the overall scope of the invention. Those skilled in the art will also recognize that the positions of wire 404A may be exchanged with that of wire 404B, and the position of wire 406A may be exchanged with that of 406B. Further, embodiments of the invention contemplate configurations where the positions of twisted wire pairs 404 and 406 are exchanged with one another. In general, the scope of the present invention pertains to a configuration of wires within the connector 414 where the twisted wire pair 412, which conducts video data signals, is disposed adjacent to (i) one side of the connector 414 and (ii) the twisted wire pair 410, which conducts power.

Interference between the twisted wire pairs 404 and 406 may also be reduced by implementing the spine 408. In particular, in some embodiments of the invention, the spine 408 is disposed centrally within the interconnect 208 in order to reduce interference between the twisted wire pairs 404, 406 and the twisted wire pair 412.

Finally, interference introduced from sources external to the interconnect 210 may be reduced by surrounding the twisted wire pairs 404, 406, 410, and 412 with the shielding 402, as shown. Such sources may include, for example, other interconnects coupling the sbox 202 to additional display devices.

Figure 5:
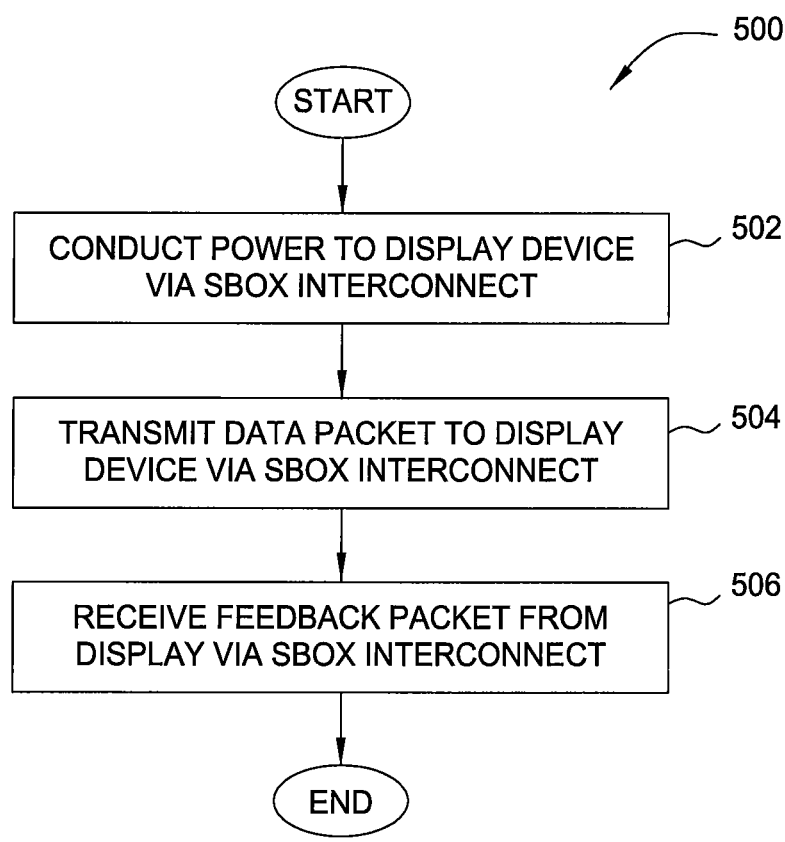
FIG. 5 is a flowchart of method steps for conducting data packets and power across the interconnect of FIG. 4.

FIG. 5 is a flowchart of method steps for conducting data packets and power across the interconnect 210 of FIG. 4. Although the method steps are described in conjunction with the systems of FIG. 4, persons skilled in the art will understand that any system configured to perform the method steps, in any order, is within the scope of the invention.

As shown, the method 500 begins at step 502, where the sbox 202 transmits power to the display device 208 via the interconnect 210. In one embodiment, the sbox 202 transmits 1 watt of power to the display device 208. At step 504, the sbox 202 transmits a data packet to the display device 208 via the interconnect 210. The data packet may comprise uncompressed, multiplexed video data. In one embodiment, the sbox 202 transmits the data packet to the display device 208 via the interconnect 210 in order to perform an alignment procedure, a firmware update, a troubleshooting subroutine and/or a diagnostic subroutine.

At step 506, the sbox 202 receives a feedback packet from the display device 208 via the interconnect 210. In one embodiment, the feedback packet includes status information associated with the display device 208. The status information may be related to an alignment procedure, a firmware update, a troubleshooting subroutine or a diagnostic subroutine. The method 500 then ends. In one embodiment, the display device 208 is coupled to an additional display device and is configured to perform steps 502, 504, 506 in order to transmit power and data to the additional display device, as well as receive feedback from the additional display device. The received feedback may then be related to the sbox 202.

In sum, a signal box (sbox) transmits both data signals and power to a display device via a single interconnect. The data signals may include packets of video data associated with a digital image to be displayed by the display device. The data signals may also include data packets associated with an alignment procedure, a firmware update, a troubleshooting subroutine and/or a diagnostic subroutine performed by the sbox with the display device. In response to the data signals, the display device may transmit feedback data packets to the sbox.

Advantageously, both data and power can be transmitted across the interconnect, thereby providing a power source for certain components within the display device, including a video processor and a control signal processor. The power source may provide DC power connections (e.g., 0-12 Volts DC power), which is, in one embodiment, separate from the display device power supply that is used to drive the display device's other image producing components. Additionally, the interconnect may be a flexible cat-6 cable, making assembly and maintenance of the display device simpler than that associated with prior art designs that employ bulky, stiff DVI cables. Finally, unlike the DVI cables used in prior art designs, data can be transmitted across the interconnect bi-directionally, allowing the display device to transmit feedback data to the sbox. Such a configuration facilitates diagnostic and alignment operations involving the display device. In general, the features of the interconnect described herein greatly simplify the connection topology associated with prior art designs that rely on a DVI cables, while maintaining the signal integrity required to form a high quality image on the display screen.

While the foregoing is directed to embodiments of the present invention, other and further embodiments of the invention may be devised without departing from the basic scope thereof, and the scope thereof is determined by the claims that follow.

We claim:

1. An image display system, comprising:
 a signal box (sbox) configured to transmit one or more data packets;
 a display device configured to receive the one or more data packets and display a digital image on a screen; and
 an interconnect coupling the sbox to the display device, comprising:
  a first electrical conductor adapted to deliver the one or more data packets from the sbox to the display device, and
  a second electrical conductor adapted to deliver power provided by the sbox to the display device, wherein the display device displays the digital image using the power provided by the sbox,
 wherein the interconnect is further configured to conduct one or more feedback packets transmitted by the display device to the sbox,
 wherein the display device transmits the one or more feedback packets in response to receiving the one or more data packets, and
 wherein the sbox transmits the one or more data packets to the display device in order to perform an alignment procedure involving the display device, and the display device transmits the one or more feedback packets to the sbox in order to report status information associated with the alignment procedure.

2. The image display system of claim 1, wherein the one or more data packets comprise uncompressed, multiplexed video data packets.

3. The image display system of claim 1, wherein the display device comprises at least one laser whose output is modulated by the processed information contained in the one or more data packets transferred in the first electrical conductor.

4. The image display system of claim 1, wherein the interconnect comprises:
 a first twisted wire pair having a first wire and a second wire that are each coupled to a pin disposed in a connector, wherein the first wire comprises the second electrical conductor; and a second twisted wire pair having a third wire and a fourth wire that are each coupled to a pin disposed in the connector, wherein the third wire comprises the first electrical conductor.

5. An image display system, comprising:
a signal box (sbox) configured to transmit one or more data packets;
a display device configured to receive the one or more data packets and display a digital image on a screen; and
an interconnect coupling the sbox to the display device, comprising:
a first electrical conductor adapted to deliver the one or more data packets from the sbox to the display device, and
a second electrical conductor adapted to deliver power provided by the sbox to the display device,
wherein the display device displays the digital image using the power provided by the sbox,
wherein the interconnect is further configured to conduct one or more feedback packets transmitted by the display device to the sbox,
wherein the display device transmits the one or more feedback packets in response to receiving the one or more data packets, and
wherein the sbox transmits the one or more data packets to the display device in order to perform a firmware update with the display device, and the display device transmits the one or more feedback packets to the sbox in order to report status information associated with the firmware update.

6. The image display system of claim 5, wherein the display device comprises at least one laser whose output is modulated by the processed information contained in the one or more data packets transferred in the first electrical conductor.

7. The image display system of claim 5, wherein the one or more data packets comprise uncompressed, multiplexed video data packets.

8. An image display system, comprising:
a signal box (sbox) configured to transmit one or more data packets;
a display device configured to receive the one or more data packets and display a digital image on a screen; and
an interconnect coupling the sbox to the display device, comprising:
a first electrical conductor adapted to deliver the one or more data packets from the sbox to the display device, and
a second electrical conductor adapted to deliver power provided by the sbox to the display device,
wherein the display device displays the digital image using the power provided by the sbox,
wherein the interconnect is further configured to conduct one or more feedback packets transmitted by the display device to the sbox,
wherein the display device transmits the one or more feedback packets in response to receiving the one or more data packets, and
wherein the sbox transmits the one or more data packets to the display device in order to perform a diagnostic subroutine involving the display device, and the display device transmits the one or more feedback packets to the sbox in order to report status information associated with the diagnostic subroutine.

9. The image display system of claim 8, wherein the display device comprises at least one laser whose output is modulated by the processed information contained in the one or more data packets transferred in the first electrical conductor.

10. The image display system of claim 8, wherein the one or more data packets comprise uncompressed, multiplexed video data packets.

11. An image display system, comprising:
a signal box (sbox) configured to transmit one or more data packets;
a display device configured to receive the one or more data packets and display a digital image on a screen; and
an interconnect coupling the sbox to the display device, comprising:
a first electrical conductor adapted to deliver the one or more data packets from the sbox to the display device,
a second electrical conductor adapted to deliver power provided by the sbox to the display device, wherein the display device displays the digital image using the power provided by the sbox
a first twisted wire pair configured to conduct power, the first twisted wire pair having:
a first wire; and
a second wire that are each coupled to a pin disposed in a connector, wherein the first wire comprises the second electrical conductor;
a second twisted wire pair configured to conduct a current mode logic signal, the second twisted wire pair having a third wire and a fourth wire that are each coupled to a pin disposed in the connector, wherein the third wire comprises the first electrical conductor;
a third twisted wire pair configured to conduct a low-voltage differential signaling signal; and
a fourth twisted wire pair configured to conduct a universal receiver/transceiver signal.

12. An image display system, comprising:
a signal box (sbox) configured to transmit one or more data packets;
a display device configured to receive the one or more data packets and display a digital image on a screen; and
an interconnect coupling the sbox to the display device, comprising:
a first electrical conductor adapted to deliver the one or more data packets from the sbox to the display device,
a second electrical conductor adapted to deliver power provided by the sbox to the display device, wherein the display device displays the digital image using the power provided by the sbox;
a first twisted wire pair that is configured to conduct power and having a first wire and a second wire that are each coupled to a pin disposed in a first set of pins disposed in a connector;
a second twisted wire pair that is configured to conduct a low-voltage differential signaling signal and having a third wire and a fourth wire that are each coupled to a pin disposed in a second set of pins disposed in the connector;
a third twisted wire pair that is configured to conduct a universal receiver/transceiver signal and having a fifth wire and a sixth wire that are each coupled to a pin disposed in a third set of pins disposed in the connector; and
a fourth twisted wire pair that is configured to conduct a command mode logic signal and having a seventh wire and an eighth wire that are each coupled to a pin disposed in a fourth set of pins disposed in the connector, wherein the first set of pins is disposed between the fourth set of pins and the third set of pins, and the first set of pins is also disposed between the second set of pins and the fourth set of pins.

13. A method for displaying a digital image on a display device, comprising:
transmitting power from a signal box (sbox) to the display device via a first conductor disposed in an interconnect; and
transmitting one or more data packets from the sbox to the display device via a second conductor disposed in the interconnect, wherein the display device displays the digital image using the power transmitted by the sbox,
wherein the interconnect is further configured to conduct one or more feedback packets transmitted by the display device to the sbox,
wherein the display device transmits the one or more feedback packets in response to receiving the one or more data packets,
wherein the sbox transmits the one or more data packets to the display device in order to perform an alignment procedure involving the display device, and the display device transmits the one or more feedback packets to the sbox in order to report status information associated with the alignment procedure.

14. The method of claim 13, wherein the one or more data packets comprise uncompressed, multiplexed video data packets.

15. The method of claim 13, wherein the sbox transmits the one or more data packets to the display device in order to perform a diagnostic subroutine involving the display device, and the display device transmits the one or more feedback packets to the sbox in order to report status information associated with the diagnostic subroutine.

16. The method of claim 13, further comprising:
receiving the one or more data packets from the sbox; and
processing at least a portion of the one or more data packets to create a signal that is configured to modulate the output of at least one laser, wherein the output of the at least one laser is configured to create at least a portion of the digital image on a screen of the display device.

17. The method of claim 13, wherein the interconnect comprises a plurality of independently shielded twisted wire pairs configured to be coupled to at least one connector, wherein each twisted wire pair within the plurality of twisted wire pairs is configured to conduct data and/or power, and each twisted wire pair is configured to be coupled to a different set of pins within a connector that forms one end of the interconnect.

18. A method for displaying a digital image on a display device, comprising:
transmitting power from a signal box (sbox) to the display device via a first conductor disposed in an interconnect; and
transmitting one or more data packets from the sbox to the display device via a second conductor disposed in the interconnect, wherein the display device displays the digital image using the power transmitted by the sbox,
wherein the interconnect is further configured to conduct one or more feedback packets transmitted by the display device to the sbox,
wherein the display device transmits the one or more feedback packets in response to receiving the one or more data packets, and
wherein the sbox transmits the one or more data packets to the display device in order to perform a firmware update with the display device, and the display device transmits the one or more feedback packets to the sbox in order to report status information associated with the firmware update.

19. A method for displaying a digital image on a display device, comprising:
transmitting power from a signal box (sbox) to the display device via a first conductor disposed in an interconnect; and
transmitting one or more data packets from the sbox to the display device via a second conductor disposed in the interconnect, wherein the display device displays the digital image using the power transmitted by the sbox,
wherein the interconnect includes:
a first twisted wire pair configured to conduct power, wherein the first twisted wire pair comprises the first conductor;
a second twisted wire pair configured to conduct a current mode logic signal, wherein the second twisted wire pair comprises the second conductor;
a third twisted wire pair configured to conduct a low-voltage differential signaling signal; and
a fourth twisted wire pair configured to conduct a universal receiver/transceiver signal.

20. The method of claim 19, wherein the first twisted wire pair is coupled to a first set of pins within a connector, the second twisted wire is coupled to a second set of pins within the connector, the third twisted wire is coupled to a third set of pins within the connector, and the fourth twisted wire is coupled to a fourth set of pins within the connector, wherein the first set of pins are disposed between the second set of pins and the third set of pins, the first of set of pins is disposed between the second set of pins and the fourth set of pins, and the second set of pins is disposed adjacent to a first side of the connector.

* * * * *